Oct. 25, 1932.  N. HENNESSY  1,884,677
PREHEATED SECONDARY OXYGEN REGULATOR
Filed Aug. 20, 1927    3 Sheets-Sheet 1
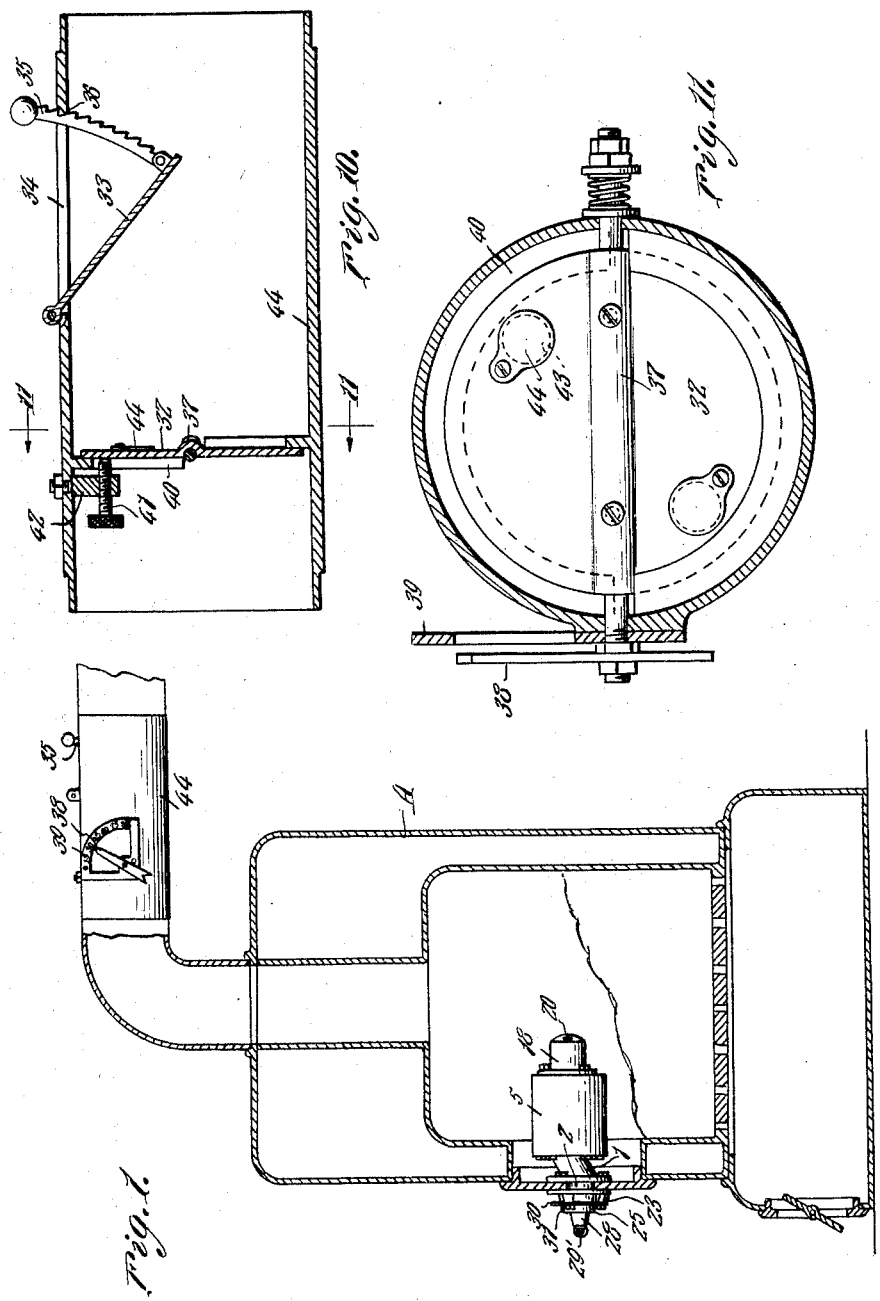

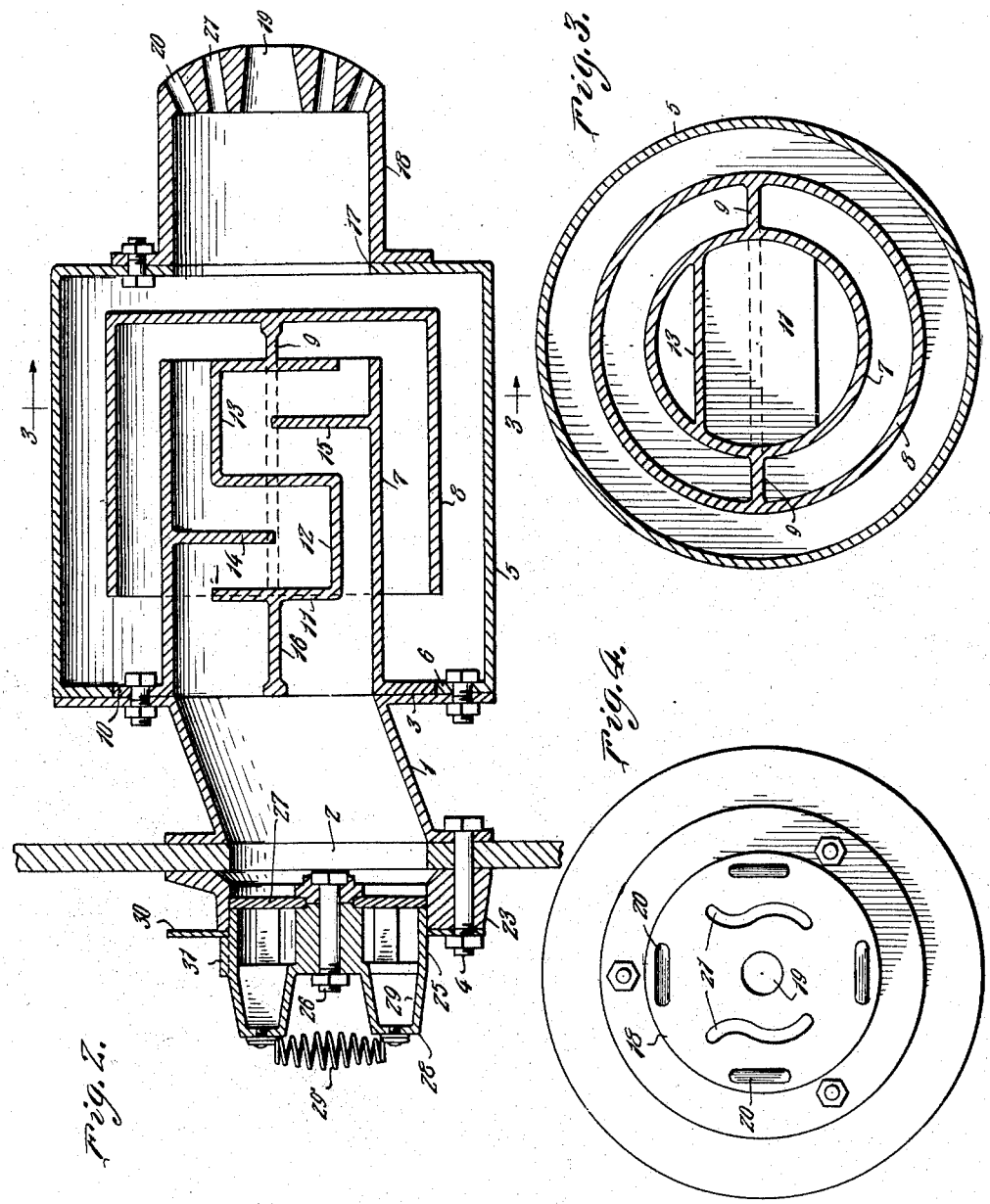

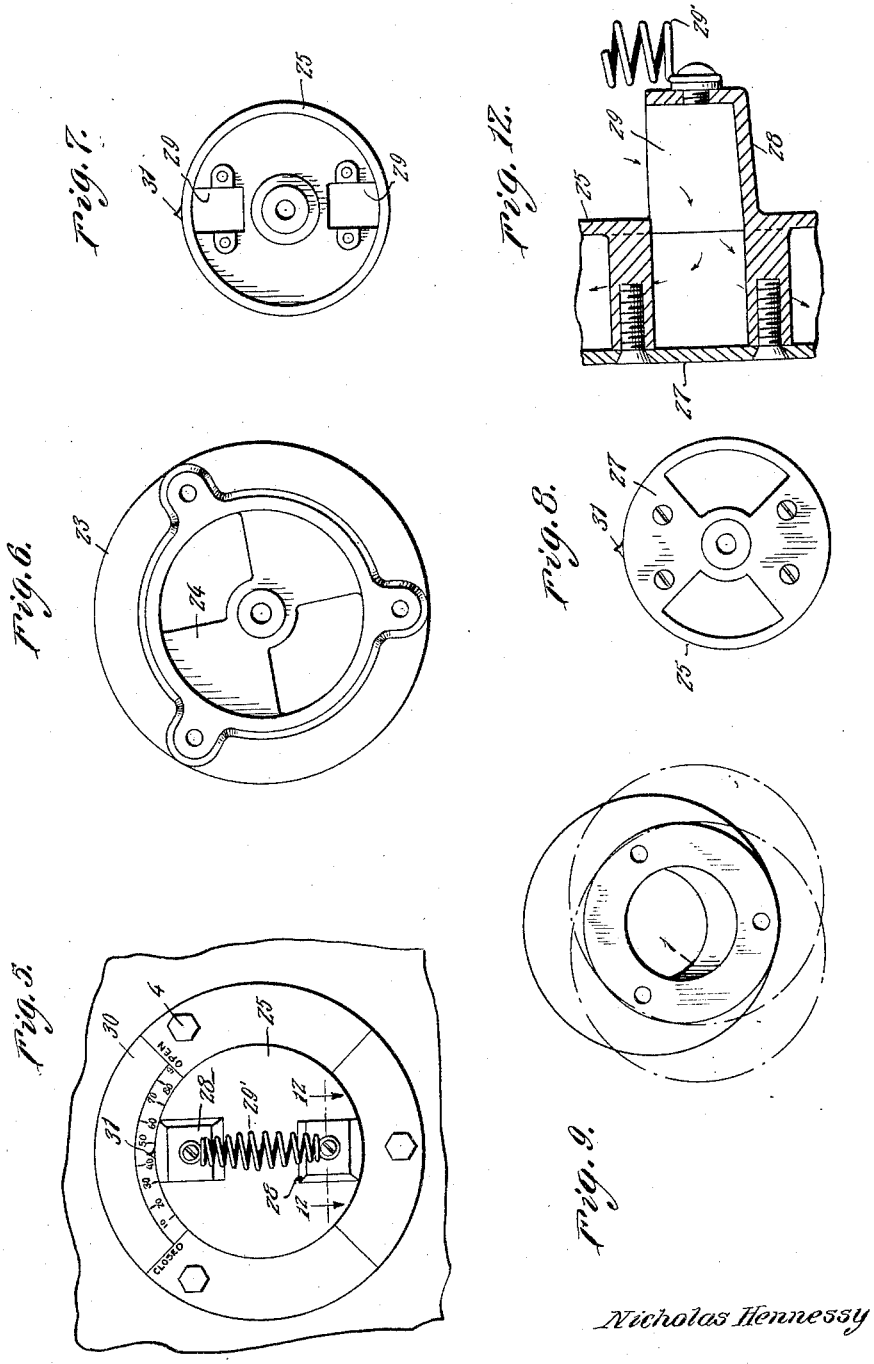

Patented Oct. 25, 1932

1,884,677

UNITED STATES PATENT OFFICE

NICHOLAS HENNESSY, OF BRISTOL, PENNSYLVANIA, ASSIGNOR TO THE INTERNATIONAL N S E CORPORATION, A CORPORATION OF DELAWARE

PREHEATED SECONDARY OXYGEN REGULATOR

Application filed August 20, 1927. Serial No. 214,415.

This invention relates to a device for providing an auxiliary air supply to a furnace or the like, the general object of the invention being to provide means for introducing streams of preheated air under high velocity into the combustion chamber of the furnace so that the air will intermingle with the gases in the chamber, thus causing combustion of the same and of the fuel so as to increase the efficiency of the furnace by securing the maximum amount of heat with the minimum amount of fuel and reducing the amount of labor on the part of the attendant.

Another object of the invention is to so arrange the nozzles, through which the air escapes from the device into the combustion chamber, that the streams of air will be directed into practically all parts of the combustion chamber so that it will be thoroughly mixed with the gases in said chamber and eliminate spaces or pockets of gas.

Another object of the invention is to provide manually operated means for controlling the amount of air entering the device and also to provide means whereby the device can be adjusted so as to secure the maximum efficiency under all conditions and also to permit the device to be placed in various kinds of furnaces.

A still further object of the invention is to so form the air passages that the air will be intensely heated before it leaves the device and to provide fans or propellers, when desired, to facilitate the passage of the air through the device.

Another object of the invention is to provide damper means which is so constructed that the chimney draft can be regulated in such a manner as to secure the best results with the device.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a sectional view through a furnace, showing the invention in use.

Figure 2 is an enlarged sectional view through the device and through a part of the furnace.

Figure 3 is a section on line 3—3 of Figure 2.

Figure 4 is a view of the nozzle end of the device.

Figure 5 is a fragmentary view of the front of a furnace, showing the outer end of the device.

Figure 6 is a view showing the outer part of the air controlling means.

Figure 7 is an end view of the rotary member which fits in the part shown in Figure 6.

Figure 8 is a view of the inner end of the rotary member.

Figure 9 is a diagrammatic view showing how the neck of the device can be adjusted to place the device in various positions.

Figure 10 is a sectional view through a section of the chimney pipe, showing the dampers therein.

Figure 11 is a section on line 11—11 of Figure 10.

Figure 12 is a section on line 12—12 of Figure 5.

In these drawings, 1 indicates a neck which is adapted to be bolted to the inner face of the door or other part of a furnace A over an opening 2 made in said part, the inner end of the neck being provided with a flange 3, the flange being vertically arranged while the neck extends at an angle to the horizontal. The body of the device is bolted to said flange and the neck is fastened to the door by three bolts 4 which pass through three holes which are arranged in the outer flange of the neck in the form of a triangle. This arrangement permits the neck to be adjusted by turning the same and placing the bolts in different holes so that the neck will extend in an opposite direction from the position which it formerly occupied and thus the device can be adjusted for use with different kinds of furnaces and so set in relation to the grate bars as to secure the most efficient results.

The body comprises an outer casing 5 which is provided with an inwardly extending flange 6 at its outer end which is bolted to the flange 3, the inner cylinder 7 and the outer cylinder 8 which is spaced an equal distance between the cylinder 7 and the casing 5 and which has its inner end closed and formed with or connected to a partition 9 which extends from the inner end of the cylinder 7 and is diametrically arranged thereon. The outer end of the cylinder 7 is formed with an outwardly extending flange 10 which is bolted to the flange 3 of neck 1 and said cylinder is in communication with the neck.

A partition is arranged in the cylinder 7 and this partition comprises three vertically arranged portions 11 which are spaced apart and one of which is arranged at the inner end of the cylinder and the other in a line with the front or outer end of the cylinder 8, with the third one intermediate the other two. The front and central portions are connected together by the lower horizontal part 12, while the central and inner or rear portions are connected together by the upper horiontal part 13. A baffle plate 14 depends from the inner wall of the cylinder 7 into the space formed by the first and second parts 11 while a baffle plate 15 extends upwardly from the inner wall of the cylinder 7 into the space formed by the second and third parts 11. A partition 16 is horizontally arranged in the outer or front end of the cylinder 7 and is connected with the first part 11, this partition 16 being in alignment with the partition 9. Thus a pair of tortuous passages is provided for the air passing through the neck, the air being divided by the partition 16 so that a part of the air passes through the upper part of the cylinder 7 and the other part passes through the lower portion of the cylinder 7. The zig-zag partition and the baffle plates 14 and 15 cause the two streams of air to take a tortuous path and then as the streams leave the cylinder 7, they enter the cylinder 8, which directs them toward the front of the device and then the streams of air flow through the space between the cylinder 8 and the casing 5 and escape through the opening 17 formed in the rear or inner end of the casing. As will be seen, the partition 9 keeps the two streams of air divided as they pass through the cylinder 8, as this partition extends to the front end of the cylinder 8. I prefer to form the cylinders 7 and 8 integral, as shown.

A nozzle member 18 is bolted to the inner or rear end of the casing 5 and surrounds the opening 17. This nozzle member is formed with a chamber, as shown, into which the two streams of air flow, this chamber acting as an expansion chamber for the air and it also acts as a mixing chamber for the two streams of air, as it will be understood that the stream of air passing through the lower part of the device will be hotter than the stream of air passing through the upper part of the device, due to the lower part of the device being nearer the fire, and the free end of the nozzle member is provided with a large tapered central opening 19, the four rectangular openings 20 which are arranged a quarter turn from each other and extend at an incline toward the outer circumference of the nozzle member and the two substantially S-shaped openings 21 which are arranged between the opening 19 and two of the openings 20, these openings 21 also extending at an incline with their outer ends closer to the circumference of the nozzle than their inner ends. The openings 20 are arranged at a greater angle than are the openings 21. These openings 19, 20 and 21 form nozzles for the ejection of the air passing through the device and as shown, the air passing from these nozzles is directed in different directions into the combustion chamber of the furnace so that the air will reach all portions of the combustion chamber.

A circular member 23 is fastened to the outer face of the door around the opening 2 by the bolts 4 which hold the neck in position. A stationary damper plate 24 is arranged in the bore of said member. A rotary member 25 is rotatably mounted in the member 23 through means of a bolt 26 which passes through the central part of the member 25 and through the plate 24 and a damper plate 27 is bolted to the inner end of the member 25 and cooperates with the plate 24 to control the amount of air entering the device. The member 25 is provided with a pair of hollow outwardly extending projections 28 which have openings 29 therein so that atmospheric air can pass through the openings 29 and pass through the member 25 through the member 23 into the neck 1, provided the rotary member is so turned that the air can pass through the openings formed in the damper plates 24 and 27. A wire handle 29 has its ends connected with the projections 28 to provide means for turning the member 25. A dial 30 is fastened to the member 23 by the bolts 4 and a pointer 31 is carried by the rotary member and cooperates with the dial for indicating the amount of adjustment of the rotary member so that this member can be easily set to allow the correct amount of air to enter the device.

From the foregoing it will be seen that the amount of air entering the device can be regulated by turning the member 28 in the member 23, and it will also be seen that the air passing through the tortuous passages in the body of the device will be highly heated, as the various parts of the body will be intensely heated by the heat generated in the furnace so that this air will escape through the nozzles very hot, and due to the construction of the device, the streams of air passing from the nozzles will have high velocity so that the streams of preheated air will thoroughly mix with the gases in the combustion chamber, causing combustion of the same and of the fuel on the grate bars. Due to the arrangement of the nozzles, the air will reach practically all parts of the combustion chamber so as to break up any pockets of gas existing in the combustion chamber. With this device, the maximum amount of heat will be secured from the minimum amount of fuel and the furnace equipped with this invention will need but little attention. Practically all the fuel will be consumed so that there will be very little clinkers so that it will not be necessary to sift the ashes.

In order to secure the most advantageous results with the device, I provide damper means in the chimney pipe which can be very finely adjusted, such means comprising a rotatable damper 32 and a check damper 33, the latter damper controlling the air entering the pipe through an opening 34 formed in the pipe and this damper is manually controlled through a rack bar 35 fastened to the damper 33 and having its teeth adapted to engage a tooth 36 formed on a part of the wall of the opening. The damper 32 is carried by a shaft 37 rotatably mounted in the pipe and having a finger 38 on its projecting end so that the shaft can be turned to adjust the damper, and this finger cooperates with a dial 39 fastened in a stationary manner to the pipe. A sectional flange 40 extends inwardly in the pipe, one section being out of alignment with the other so that both sections can be engaged by the damper when the same is closed, as clearly shown in Figures 10 and 11. By using this flange, there is no danger of air escaping around the edges of the damper. A set screw 41 is carried by a depending part 42 in the pipe so that the damper can be nicely regulated as to its closing movement. The damper 32 is provided with holes 43 which are closed by the flaps 44 which also provide means for controlling the draft through the chimney. As will be seen, the damper 33 is placed in rear of the damper 32 so that its checking action is greatly increased.

These two dampers 32 and 33 are placed in a section 45 of the smoke pipe.

This combination of the auxiliary air supplying means and the damper means not only results in securing the maximum amount of heat from a minimum amount of fuel, but it also insures a slow fire of intense heat so that but little attention is required to run the furnace and it also insures the furnace heating up very quickly. A furnace equipped with this device will burn practically all the fuel so that a saving of fuel is effected and the fuel is practically all consumed so that there are no clinkers and very little ash. Soot and dirt are also reduced to a minimum, due to the perfect combustion of the fuel and gases. Figure 1 shows how the fuel should be banked in the furnace to secure the best results.

When necessary or desired, the neck can be omitted and the body of the device fastened directly to a part of the furnace.

The operation of the furnace would be in this wise:—

The average temperature required in the day is generally 70° and at night 10° less. Therefore, one has to bring back in the morning the rise in the 10° temperature. One would, therefore, go to the furnace, open the ash pit door and open the smoke pipe regulation from 70° to 90°; the indication on the door, while the fire was being thus whipped, would be at "closed" so that no cold air is entering into the combustion chamber as this would be detrimental at this stage of the operation of the furnace. The device being to regulate a steady, even temperature, the change of the temperature from 60° to 70° would be by slow process and the effect of opening the ash pit door and the damper control would be to increase the rate of combustion only. After two or three minutes, the efficiency of the combustion can be handled by the regulating for the day (according to the kind of day, whether moderate or zero) by moving the indicator on the door, the indicator on the smoke pipe and the regulation of the ash pit door at the same degree as recorded on the door indicator and the smoke pipe indicator. The efficiency of combustion in the combustion chamber is, with the device, far greater than would be obtained without the device, as the preheated secondary oxygen mixing with the carbon monoxide rising from the surface of the fuel bed would take the nature of $CO_2$ and carry approximately 14,500 B. t. u.'s as against the approximately 4,500 B. t. u.'s obtained from carbon monoxide of CO. At the end of the day, to make the night temperature 10° less, which is usually the case, the regulation of the door and the smoke pipe would be moved back toward zero and the ash pit would be regulated to the same degree as was shown on the door on the smoke pipe. For example, the night being a moderate one, the indicator on the door would be at 5° open, the smoke pipe indicator would also be at 5° open and the ash pit door would be at 5° open. The change from the night heat to the day heat would be as previously described and so this would continue day after day. The only matter left for the operator to consider is the one of whether the day is what would be called "zero" or "moderate" or whether the night is what would be called "zero" or "moderate". The regulation for zero night would be about 15° while that of a moderate night would be about 5°. The regulation for a zero day would be about 35°, while that of a moderate day would be about 25°.

It will, of course, be understood that the damper which controls the entrance of air into the ash pit is provided with means whereby it can be accurately set, such as a dial and pointer, and the three dials, or other setting means, are so arranged that the fingers or pointers can be set on the same graduations to adjust the three devices to secure the desired results.

What I claim is:—

1. A combustion promoting device for a furnace comprising a casing arranged within the furnace, means for connecting the front end of the casing with the exterior of the furnace, a nozzle member connected with the other end of the casing having nozzles therein extending in different directions and said nozzles being of different cross sectional shapes, a pair of cylinders in the casing, one cylinder being of cup shape and encircling the rear end of the first cylinder with its closed end spaced from the inner end of the other cylinder and partitions in the first cylinder forming a tortuous air passage.

2. A combustion promoting device for a furnace comprising a body, means therein for forming tortuous air passages, means on the body for communicating the outer ends of the passages with the exterior of the furnace, a nozzle member connected with the inner end of the body and having a chamber therein for communication with the inner ends of the passages, and the free end of the nozzle member having nozzle openings therein, some of which are arranged to direct the air upwardly, downwardly and to the sides of the combustion chamber, said openings being arranged at an angle to the horizontal and other of said openings directing the air into the central portions of the combustion chamber, one of the last mentioned openings being centrally arranged and tapering from its inner to its outer end and the other of said last mentioned openings being of substantially S shape and arranged one on each side of the central opening, the first mentioned openings being of elongated shape, with those at the sides vertically arranged and those at the top and bottom horizontally arranged.

3. A combustion promoting device comprising a body, means therein for forming tortuous air passages, means for communicating the outer ends of the passages with the exterior of the furnace, a nozzle member connected with the inner end of the body and receiving the streams of air passing therethrough, the free end of the nozzle member having nozzle openings therein, one of which is centrally arranged and tapers from its inner to its outer end, two of the openings being arranged at the sides of the device and two of said openings being arranged at the top and bottom of the device, the side and upper and lower openings being elongated and arranged at an angle from the horizontal, with the side openings vertically arranged and the upper and lower openings horizontally arranged and a pair of the openings arranged between the central opening and the side openings, one on each side of the central opening, these openings being of substantially S shape.

In testimony whereof I affix my signature.

NICHOLAS HENNESSY.